Sept. 10, 1935. A. B. DU MONT 2,014,106

VOLTMETER FOR VACUUM TUBES

Filed Sept. 19, 1932

INVENTOR
Allen B. DuMont
BY Thomas Howe
ATTORNEY

Patented Sept. 10, 1935

2,014,106

UNITED STATES PATENT OFFICE 2,014,106

VOLTMETER FOR VACUUM TUBES

Allen B. Du Mont, Upper Montclair, N. J.

Application September 19, 1932, Serial No. 633,748

4 Claims. (Cl. 250—27.5)

The present invention relates to means especially useful for ascertaining the voltage between the electrodes of a vacuum tube although it may have other applications.

In certain applications of vacuum tubes it is desirable to note the voltage between the electrodes. This is particularly true in connection with the uses of such tubes in radio transmitting stations. It is inconvenient and costly to provide a voltmeter separate from the tube for ascertaining the desired voltage.

It is therefore an object of the present invention to provide a means for indicating the desired voltages which shall depend for its operation upon the electronic stream produced in the tube and which may be incorporated in the tube itself although it may be found convenient to mount one or more parts of the device independently of the tube.

A further object of the invention is to utilize electronic streams produced in tubes of the audion type for indicating the voltage whereby the tube not only functions in the usual manner of an audion tube but also provides a means of indicating voltage, current, etc.

A further object of the invention is to make use of an electronic stream produced in vacuum tubes of the audion type whereby the tube not only functions for the usual purposes of tubes of that type but also provides the cathode rays for operating upon fluorescent material for various purposes.

A further object of the invention is to utilize an electronic stream produced in a tube of the audion type to act upon fluorescent material whereby the tube functions for the purposes of the tube of the audion type and also furnishes the electronic stream for acting upon the fluorescent material, and further providing means responsive to any conditions desired for deflecting the electronic stream acting upon the fluorescent material whereby the luminosity created in the fluorescent material by the electronic stream may be shifted as desired.

Other and ancillary objects of the invention will appear hereinafter.

In the accompanying drawing which illustrates the invention:—

Figure 1:
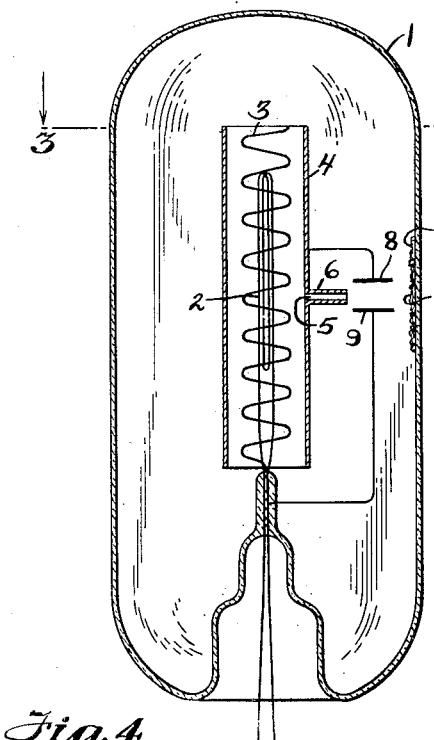
Fig. 1 is a vertical section on the line 1—1 of Fig. 3 through a vacuum tube equipped with the invention.
Figure 2:
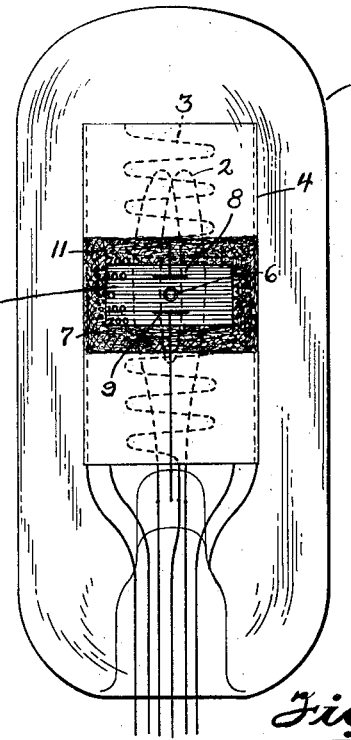
Fig. 2 is a side elevation of the apparatus of Fig. 1 viewed from the left of Fig. 3.
Figures 3, 7:
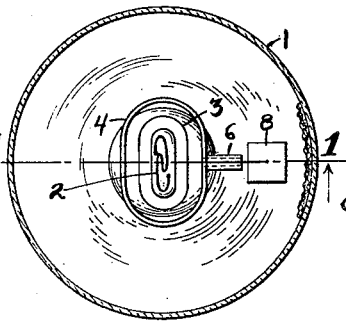
Fig. 3 is a section on the line 3—3 of Fig. 1.
Fig. 7 is an axial sectional view, partly broken away, similar to Fig. 4, of a modified form of tube adapted to indicate a plurality of voltages between electrodes of the tube by means of a plurality of cathode beams corresponding respectively to the voltages to be indicated.

Referring to the drawing, and first to Figs. 1, 2 and 3, the apparatus comprises a vacuum tube of the audion type having an envelope 1 of glass evacuated to the order of 1 millionth of an atmosphere. Contained within the envelope, and mounted upon a suitable stem, is the electron emitting, such as a suitable thorium coated, "filament" 2, which is enclosed by a helical coil 3 of wire constituting the "grid" and surrounding the filament and grid, is a metal tube 4 constituting the "plate".

As is well known in the operation of audion tubes for the various purposes to which they are adapted, a source of direct current voltage is connected with its plus terminal to the plate 4 and its minus terminal connected with the filament 2. The filament being heated by passing a suitable current through it as is well understood, a stream of electrons will flow from the filament to the plate, the grid exercising a modifying influence upon this stream according to the results desired to be produced as is well understood in connection with the use of tubes of the audion type.

In the plate 4 is formed a small hole 5 which communicates with a tubular member 6 mounted upon the plate. A stream of electrons being a portion of the electrons moving from the filament to the plate, will be projected through the hole 5 and tube 6 in a beam or pencil which impinges against the fluorescent strip 7 of material adapted to fluoresce under the action of the electronic or cathode ray or beam. Upon opposite sides of the cathode ray are deflection plates 8 and 9 respectively connected to the electrodes between which it is desired to note the potential, in this case the deflection plate 8 being connected to the tube 4 and the deflection plate 9 being connected with the filament.

With no voltage on the plates 8 and 9 the luminous spot created in the fluorescent material by the cathode beam will be directly opposite the tube 6 and the deflection of the ray, and consequently of the luminous spot, will, at other times, be in accordance with the potential difference or voltage between the plates 8 and 9. The deflection of the cathode ray and therefore the position of the luminous spot on the fluorescent material will be measure of the voltage between the plate 4 and the filament 2.

The fluorescent material, it will be observed, is mounted upon the inside of the envelope 1 and adjacent to the path of the spot, and upon the outside of the envelope, may be etched a scale 10 calibrated in volts so that the voltage between the electrodes 2 and 4 may be read directly in volts from the position of the luminous spot. Instead of etching the scale upon the envelope it may be made upon a piece of transparent or translucent paper which is then secured in position on the bulb or envelope.

A suitable fluorescent material for use as described is zinc silicate which gives a green light under the action of the electronic stream.

It may be that it would be desirable to call special attention to a maximum permissible voltage or to other critical values. To this end fluorescent material giving a different colored light under the cathode rays from that ordinarily appearing, may be inserted at the desired points. Thus, at the upper end of the strip 7 of zinc silicate is placed some calcium tungstate 11 which receives the impact of the cathode ray when the voltage has exceeded the maximum allowable. The luminous color of the calcium tungstate will be blue so that the existence of the blue light will indicate that the maximum permissive voltage has been reached or passed.

It will be observed that the cathode beam and consequently the spot on the fluorescent screen will faithfully follow variations in the voltage, the shifting of the spot being instantaneous with any change in voltage. In other words there is no time lag between the change in voltage and the movement of the indicating spot so that all changes in voltage, including peak voltages that occur during modulation, are indicated. This could not occur with voltmeters having moving parts owing to the mechanical inertia of those parts.

The intensity of luminosity of the spot also affords an indication of the current flowing from the filament to the plate.

Figure 4:
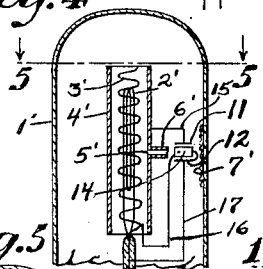
Fig. 4 is a vertical axial section, similar to Fig. 1, of a modified form of tube adapted to indicate a plurality of voltages between electrodes of the tube, the plurality of voltages being indicated by a single cathode beam, such view being on a smaller scale than Figs. 1, 2 and 3 and partly broken away.
Figure 5:
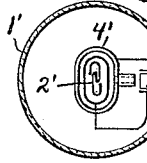
Fig. 5 is a section on the line 5—5 of Fig. 4.
Figures 6, 8:
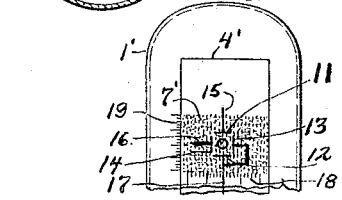
Fig. 6 is a side elevation of the tube shown in Fig. 4, viewed from the right hand of that figure.
Fig. 8 is a side elevation, partly broken away, of the tube as shown in Fig. 7 viewed from the right hand.

Referring now to Figs. 4, 5 and 6, the tube therein shown is of the audion type comprising a glass envelope 1', a heated filament 2', the grid 3' and the plate 4' and in this plate is a hole 5' communicating with a tubular member 6' secured to the plate. The beam of electrons projected through this hole and tube against the fluorescent screen or strip 7' has the pair of plates 11 and 12 respectively above and below it. 90° removed from the pair of plates 11 and 12 are the plates 13 and 14 on opposite sides of the path of the beam. The deflection plate 11 is connected by a conductor 15 with the plate 4', the deflection plate 14 is connected with the grid 3' by a conductor 16 and the two deflection plates 12 and 13 are connected together and to the filament 2' by the conductor 17. Any voltage between the filament and the plate 4' is impressed upon the plates 11 and 12 and the cathode beam is deflected vertically in accordance with such voltage, while any voltage between the filament and the grid is impressed upon the deflecting plates 13 and 14 and the cathode beam is horizontally deflected accordingly. The horizontal deflection of the beam is therefore a measure of the voltage between the grid and the filament, and the vertical deflection of the beam is a measure of the voltage between the filament and the plate. In any position of the light spot occasioned by the impingement of the cathode beam upon the screen 7' its horizontal deflection (the voltage between the grid and filament) can be read upon the voltage calibrated scale 18 etched upon the outer surface of the glass envelope, and the vertical deflection of the beam (the voltage between the plate 4' and the filament) may be read upon the similarly etched voltage calibrated scale 19.

Referring to Figs. 7 and 8 the audion type tube 20 comprising the glass envelope 1'', the heated filament 2'', the grid 3'' and the plate 4'' has a plurality of separated holes 20 and 21 connected respectively with tubes 22 and 23 mounted in the plate. There will be projected through each of these tubes a stream of electrons constituting a cathode beam, each of these beams being adapted to impinge upon the fluorescent screen 7'' at different points and produce a light spot for each beam. Arranged respectively above and below the beam through the tube 22 are the deflection plates 24 and 25, the deflection plate 24 being connected through the conductor 26 with the filament and the deflection plate 25 being connected by the conductor 27 with the plate 4''. Any voltage between the filament and the plate 4'' therefore will be impressed upon the deflection plates 24 and 25 which will deflect the cathode beam in proportion, thereby deflecting the light spot produced upon the screen 7'' in proportion to the voltage, the deflection of this light spot being read upon a scale 28 calibrated in volts, such scale being etched upon the exterior of the glass envelope or applied in other suitable ways.

Upon opposite sides of the cathode beam through the tube 23 are the deflection plates 29 and 30, the plate 29 being connected through the conductor 26 with the filament and the plate 30 being connected by the conductor 31 with the grid. Any voltage between the filament and grid will therefore be impressed upon the plates 29 and 30, the beam and its light spot on the screen 7'' deflected accordingly and the voltage between the filament and grid, i. e. the deflection of the light spot, may be read upon the voltage calibrated scale 32.

While the invention has been illustrated in what are considered its best applications it may have other embodiments without departing from its spirit and is not therefore limited to the structures shown in the drawing.

What I claim is:

1. The combination with a vacuous envelope of electrodes therein, certain of said electrodes being adapted to produce a stream of electrons, and deflecting plates for said stream respectively connected to the electrodes within said envelope between which the voltage is to be observed.

2. The combination with a vacuous envelope of electrodes therein, certain of said electrodes being adapted to produce a stream of electrons, deflecting plates for said stream, said plates being respectively connected with the electrodes within said envelope between which the voltage is to be observed, a fluorescent substance adapted to be acted upon by said stream to produce luminosity and a scale for noting the position of the luminous spot produced in said substance by said stream.

3. A vacuum tube of the audion type comprising a vacuous envelope containing electrodes comprising an electron emitting filament, a grid and a plate, said plate having an opening through which a stream of electrons may pass, fluorescent material mounted upon the inside of said envelope against which said stream is adapted to impinge to produce a luminous spot and deflecting plates for said stream, said plates being respectively connected with certain of said electrodes between which it is desired to observe the voltage.

4. A vacuum tube of the audion type comprising a vacuous envelope containing electrodes comprising an electron emitting filament, a grid member surrounding said filament, a plate member surrounding said grid member, said plate having a hole through which a stream of electrons may pass, fluorescent material upon the inside of said envelope adapted to be acted upon by said stream to produce a luminous spot and plates for deflecting said stream respectively connected with said plate and said filament.

ALLEN B. DU MONT.